United States Patent [19]
Imahashi

[11] Patent Number: 6,107,385
[45] Date of Patent: Aug. 22, 2000

[54] FLAME-RETARDANT RESIN COMPOSITION AND ITS USE

[75] Inventor: Takeshi Imahashi, Takamatsu, Japan

[73] Assignee: Kyowa Chemical Industry Co., Ltd., Takamatsu, Japan

[21] Appl. No.: 09/300,380

[22] Filed: Apr. 27, 1999

[30] Foreign Application Priority Data

Apr. 28, 1998 [JP] Japan ................................. 10-134339
Feb. 4, 1999 [JP] Japan ................................. 11-027840

[51] Int. Cl.$^7$ ................................. C08K 3/32; C08K 3/22
[52] U.S. Cl. ......................... 524/414; 524/261; 524/264; 524/543; 524/502; 524/495; 524/436; 524/394; 524/557; 524/504; 524/505; 525/88; 525/222; 525/221; 525/70; 525/78
[58] Field of Search ................................. 524/414, 261, 524/264, 543, 502, 495, 436, 394, 557, 504, 505; 525/88, 222, 221, 70, 78

[56] References Cited

U.S. PATENT DOCUMENTS

| | | | |
|---|---|---|---|
| 4,098,762 | 7/1978 | Miyata et al. | 524/162 |
| 5,792,560 | 8/1998 | Friedman et al. | 428/441 |
| 5,889,087 | 3/1999 | Hayashi et al. | 523/173 |
| 5,925,700 | 7/1999 | Imahashi | 524/397 |

FOREIGN PATENT DOCUMENTS 0 731 136  9/1996  European Pat. Off. .
0 780 425  6/1997  European Pat. Off. .

*Primary Examiner*—Robert Dawson
*Assistant Examiner*—Kuo-Liang Peng
*Attorney, Agent, or Firm*—Wenderoth, Lind & Ponack, L.L.P.

[57] ABSTRACT

A flame-retardant resin composition, which comprises 100 parts by weight of a synthetic resin having 70 to 100% by weight of metallocene LLDPE, 20 to 100 parts by weight of a magnesium hydroxide having a BET specific surface area of 20 m$^2$/g or less, an average secondary particle diameter of 5 μm or less, measured according to a laser diffraction scattering method, and a water-soluble sodium salt content of 500 ppm or less as a sodium, 1 to 20 parts by weight of red phosphorus having an average secondary particle diameter of 30 μm or less and 0.1 to 20 parts by weight of a carbon powder, the total of the magnesium hydroxide, the red phosphorus and the carbon powder being 120 parts by weight or less.

9 Claims, No Drawings

FLAME-RETARDANT RESIN COMPOSITION AND ITS USE

FIELD OF THE INVENTION

The present invention relates to a halogen-free metallocene LLDPE flame-retardant resin composition and its use. More specifically, the present invention relates to a flame-retardant resin composition which is obtained by improving metallocene LLDPE in flame-retardancy remarkably, which has mechanical strength and a surface-whitening resistance sufficient for practical use and which has a texture equivalent to that of a polyvinyl chloride resin and relates to a molded article obtained therefrom.

PRIOR ART OF THE INVENTION

A polyvinyl chloride resin is a synthetic resin which is excellent in flame-retardancy and which is also excellent in processability, mechanical strength and texture since the polyvinyl chloride has a halogen in its molecule. However, it is well known that the polyvinyl chloride resin has a fatal problem, that is, when the polyvinyl chloride resin is subjected to an incineration disposition after the polyvinyl chloride has had no more use, the polyvinyl chloride resin generates dioxin at burning unless it is carefully burnt at 800° C. or more. Further, the ashes thereof contain Pb, Sb, Ba and the like, which have been incorporated as a stabilizer, an additive, etc. So, there have been arguments concerning the disposition of the ash.

Concerning the dioxin, recently, there is remarkably closed up another problem of an endocrine disrupter chemical (environmental hormone) other than the problem of its toxicity. Therefore, the developments of safe techniques which can be substituted for the polyvinyl chloride resin are strongly demanded in the fields of a flame-retardant resin composition and a molded article requiring a flame-retardancy. However, in the fields of halogen-free flame-retardant resin compositions and molded articles obtained from the halogen-free flame-retardant resin compositions, such as a thin molded article like a film, it is a reality that there has not yet been proposed a technique which has a flame-retardancy, mechanical strength, surface-whitening resistance and a texture equivalent to those of the polyvinyl chloride resin.

With such a background, metallocene LLDPE has been recently attracting attention as a halogen-free resin to be made flame-retardant, since the metallocene LLDPE can maintain its mechanical strength in a practically usable range even when a filler such as a metal hydroxide is incorporated in a relatively large amount (appropriately to an amount of about 1.2 times by weight of the resin). However, the metallocene LLDPE is a flammable synthetic resin having an oxygen index of about 17.5, so that it is impossible to easily convert this resin to a resin composition or a molded article having a flame-retardancy, mechanical strength, surface-whitening resistance and a texture equivalent to those of the polyvinyl chloride resin, by using only a halogen-free flame-retardant. JPA-9-77917 and JPA-9-77916 publications propose, as a flame-retardant resin composition of metallocene LLDPE, techniques using a metal hydroxide or red phosphorus. However, these techniques have not yet obtained the above properties equivalent to those of the polyvinyl chloride resin.

The proposal in JPA-9-77917 publication basically uses only a metal hydroxide as a flame-retardant so that the flame-retardancy is insufficient. It is impossible to use the technique of JPA-9-77917 for improving the flame-retardancy of a thin molded article such as a film. The proposal in JPA-9-77916 publication discloses the example using a metal hydroxide in combination with red phosphorus. Further, the example using a magnesium hydroxide in combination with red phosphorus is also disclosed in it. The technique of JPA-9-77916 is improved in flame-retardancy as compared with the technique of JPA-9-77917.

It is introduced that, owing to this proposal, this flame-retardant resin composition can be used in the field of materials for covering an electric wire, such as electrical insulating wires or cables. However, there is no description about the field of a thin molded article such as a film. Further, this proposition has no description about the average secondary diameters of magnesium hydroxide and red phosphorus, the specific surface area of magnesium hydroxide and the sodium content of a water-soluble sodium salt. Higher flame-retardancy is required for a thin molded article such as a film as compared with a case using a magnesium hydroxide and red phosphorus in an electricwire covering material. However, JPA-9-77916 has no description concerning this fact.

When the average secondary particle diameters and the BET specific surface area of magnesium hydroxide and red phosphorus are too large, it is impossible to impart sufficient mechanical strength to a molded article and there is a problem that the surface of a molded article is rough as a texture. When the particle diameter of red phosphorus is too large, there is a problem that the effect of improving flame-retardancy is low. When a sodium content in water-soluble sodium salt contained in the magnesium hydroxide is too large, there is a problem that the surface-whitening phenomenon of a molded article is prominent, which impairs the appearance of a molded article. The term "surface whitening phenomenon" in the present invention refers to the following phenomenon. When a molded article of a magnesium hydroxide-containing flame-retardant resin composition is placed in the air or in water for a long time, the magnesium hydroxide is reacted with carbonic acid gas in the air or carbonic acid in water to form a magnesium carbonate type compound, and the magnesium carbonate type compound bleeds on the surface of the molded article. Further, light is scattered in pores on the surface of the molded article, which pores are marks of the magnesium hydroxide lost by the reaction. These states generate the "surface-whitening phenomenon".

For preventing the surface-whitening phenomenon, a certain effect can be obtained, for example, by surface-treating the surface of a magnesium hydroxide with a proper surface-treating agent or by incorporating a fatty acid metal salt of alkaline earth, such as magnesium stearate, at a kneading time, while the effect is insufficient. For inhibiting the surface-whitening phenomenon fully, it is very important point to diminish the amount of magnesium hydroxide to be contained.

As described above, unfortunately, in the field of the halogen-free metallocene LLDPE flame-retardant resin composition, no technique which gives a material having a thickness of a film and having the above-mentioned excellent properties equivalent to those of polyvinyl chloride is provided under the current circumstances.

SUMMARY OF THE INVENTION

It is an object of the present invention to provide a flame-retardant resin composition by using only a halogen-free flame-retardant to metallocene LLDPE, which composition can give a sufficient flame-retardancy to a thin molded article like a film, which composition has a texture equivalent to that of a polyvinyl chloride having no sense of stiffness or roughness, which composition has no problem in mechanical strength and surface-whitening resistance and which composition generates no dioxin at burning.

It is another object of the present invention to provide a molded article obtained from the above resin composition.

According to the present invention, there is provided a flame-retardant resin composition comprising 100 parts by weight of a synthetic resin having 70 to 100% by weight of an ethylene-α-olefin copolymer (metallocene LLDPE hereinafter) which is produced by using a metallocene catalyst (single site catalyst) and which is substantially in a linear state, 20 to 100 parts by weight of a magnesium hydroxide having a BET specific surface area of 20 $m^2/g$ or less, an average secondary particle diameter of 5 $\mu$m or less, measured by a laser diffraction scattering method, and a water-soluble sodium salt content of 500 ppm or less, as a sodium, 1 to 20 parts by weight of red phosphorus having an average secondary particle diameter of 30 $\mu$m or less and 0.1 to 20 parts by weight of a carbon powder, the total of the magnesium hydroxide, the red phosphorus and the carbon powder being 120 parts by weight or less.

According to the present invention, further, there is provided a molded article obtained from the above resin composition.

DETAILED DESCRIPTION OF THE INVENTION

The metallocene LLDPE used in the present invention is an object resin to be made flame-retardant in the present invention. The metallocene LLDPE is an ethylene-α-olefin copolymer wherein the α-olefin is a material (polymer) having 3 to 12 carbon atoms. Specific examples of the α-olefin include propylene, butene-1, hexene-1, 4-methylpentene-1, octene-1, decene-1 and dodecene-1.

In the present invention, for improving the resin composition in flame-retardancy, synthetic resins having an oxygen atom in a molecule structure may be used in an amount of 30 parts by weight or less in 100 parts by weight of the synthetic resin content. Examples of the synthetic resins having an oxygen atom in a molecule structure include an ethylene-vinyl acetate resin (EVA), an ethylene-ethyl acrylate resin (EEA), a polyvinyl butyral resin (PVB), a polyvinyl alcohol resin (PVA), an ethylene acrylic acid copolymer resin, an ionomer resin, a polyamide resin and a polyurethane resin.

For improving mechanical strength or improving flexibility, in the present invention, a polymer alloy compatibilizing agent may be used in an amount of 30 parts by weight or less in 100 parts by weight of the resin content.

Examples of the polymer alloy compatibilizing agent include a maleic anhydride-modified styrene-ethylene-butylene resin, a maleic anhydride-modified styrene-ethylene-butadiene resin, a maleic anhydride-modified polyethylene, a maleic anhydride-modified EPR, a maleic anhydride-modified polypropylene, a carboxyl-modified polyethylene, an epoxy-modified polystyrene/PMMA, a polystyrene-polyimide block copolymer, a polystyrene-polymethyl methacrylate block copolymer, a polystyrene-polyethylene block copolymer, a polystyrene-ethyl acrylate graft copolymer, a polystyrene-polybutadiene graft copolymer, a polypropylene-ethylene-propylene-diene graft copolymer, a polypropylene-polyamide graft copolymer and a polyethyl acrylate-polyamide graft copolymer.

In the present invention, for maintaining the excellent mechanical strength and surface appearance of a molded article, there is used a magnesium hydroxide having a BET specific surface area of 20 $m^2/g$ or less, preferably 1 to 10 $m^2/g$, and an average secondary particle diameter of 5 $\mu$m or less, preferably 0.4 $\mu$m to 2 $\mu$m, measured according to a laser diffraction scattering method.

For preventing the surface-whitening phenomenon of a molded article, there is used a magnesium hydroxide having, as a sodium, a water-soluble sodium salt content of 500 ppm or less, preferably 200 ppm or less, more preferably 100 ppm or less. In the present invention, the water-soluble sodium salt content in the magnesium hydroxide can be also diminished by the following method. That is, a synthesized magnesium hydroxide or a surface-treated magnesium hydroxide is dehydrated and dried fully before drying it or a synthesized magnesium hydroxide or a surface-treated magnesium hydroxide is further washed with water after dehydration and then dried.

In the present invention, the amount of the magnesium hydroxide to be used is 20 to 100 parts by weight, preferably 40 to 80 parts by weight, per 100 parts by weight of the resin content. When the amount of the magnesium hydroxide is less than the lower limit of the above range, the flame-retardancy is poor. When the amount of the magnesium hydroxide is larger than the upper limit of the above range, the mechanical strength is insufficient and the texture of a molded article threatens to be stiff.

The magnesium hydroxide used in the present invention may be a magnesium hydroxide which is surface-treated in advance or a magnesium hydroxide which is not surface-treated. When the magnesium hydroxide which is not surface-treated is used, the melt index of a resin composition tends to decrease and a molded article tends to show a surface-whitening phenomenon extremely. Therefore, it is preferred to incorporate a higher fatty acid having at least 10 carbon atoms, a magnesium salt thereof, a calcium salt thereof, a zinc salt thereof or an aluminum salt thereof and/or a coupling agent together with the magnesium hydroxide at a kneading or molding time. The amount to be incorporated is preferably 10 parts by weight or less per 100 parts of the magnesium hydroxide.

Examples of the surface treating agent for the magnesium hydroxide include higher fatty acids having at least 10 carbon atoms, such as stearic acid and palmitic acid, alkali metal salts thereof, amine salts, silane-coupling agents such as vinylethoxysilane, vinyl-tris(2-methoxy)silane, gamma-methacryloxypropyltrimethoxysilane, N-phenyl-γ-aminopropyltrimethoxysilane, gamma-aminopropyltrimethoxysilane, N-β-(aminoethyl)-γ-aminopropyltrimethoxysilane, beta-(3,4-ethoxycyclohexyl) ethyltrimethoxysilane, gamma-glycyloxypropyltrimethoxysilane and gamma-mercaptopropyltrimethoxysilane, titanate-based coupling agents such as isopropyltriisostearoyltitanate, isopropyltris (dioctylpyrophosphate)titanate, isopropyltri(N-aminoehtyl-aminoethyl)titanate and isopropyltridecylbenzensulfonyltitanate, aluminum-based coupling agents such as acetoalkoxyaluminumdiisopropylate and mono or di ester of orthophosphoric acid and a stearyle alcohol, an acid thereof and phosphoric acid-portion esters such as an alkali metal salt. The surface-treating agent is used for the surface-treatment in the range of 10 parts by weight or less, per 100 parts by weight of the metal hydroxide. The surface-treating agents may be used in combination. The surface-treatment may be carried out by a wet method or a dry method.

In the present invention, there can be used a magnesium hydroxide whose surface is acid-resistance-covered with at least one which is selected from the group consisting of a silicon compound, a boron compound and an aluminum compound. In the present invention, fundamentally, the surface-whitening phenomenon can be inhibited at a low degree, since the amount of the magnesium hydroxide is small. The surface-whitening phenomenon may be further inhibited by using an acid-resistance-covered magnesium hydroxide.

The acid-resistance-covering agent includes sodium metasilicate, sodium orthosilicate, potassium metasilicate, potassium orthosilicate, liquid glass, sodium tetraborate, sodium metaborate, potassium metaborate, sodium orthoaluminate, sodium metaaluminate, potassium orthoaluminate, potassium metaaluminate, aluminum chloride, aluminum nitrate, aluminum sulfate and aluminum phosphate. The acid-resistance-covering agent is used in an amount of 2 parts by weight or less, as a Si, B or Al, per 100 parts of the magnesium hydroxide. The thus acid-resistance-covered magnesium hydroxide is sometimes additionally treated with the above surface-treating agent such as higher fatty acids and the resultant magnesium hydroxide may be used in the present invention.

The red phosphorus used in the present invention has an average secondary particle diameter of 30 µm or less, preferably 5 µm or less, measured according to a laser diffraction scattering method. There is preferably used a red phosphorus which is surface-covered for inhibiting the occurrence of phosphine gas due to heating at a burning or processing time. Preferred examples of the surface-covered red phosphorus include a thermosetting resin-covered red phosphorus, an olefin-covered red phosphorus, a carboxylic acid polymer-covered red phosphorus, a titanium oxide thermosetting resin-covered red phosphorus, a titanium—aluminum condensate-covered red phosphorus and a titanium—cobalt complex hydrated oxide-covered red phosphorus. Since the amount of the red phosphorus to be incorporated is considerably smaller than that of the magnesium hydroxide, a red phosphorus having a somewhat larger average secondary particle diameter than that of the magnesium hydroxide can be used in the present invention. However, when the average secondary particle diameter of the red phosphorus is larger than 30 µm, a molded article threatens to be deteriorated in mechanical strength or in effect of flame-retardancy improvement or the surface of the molded article threatens to be rough. Therefore, a red phosphorus having an average secondary diameter of 30 µm or less, preferably 15 µm or less, more preferably 5 µm or less, is used in the present invention.

In the present invention, a carbon powder is used for further improving the resin composition in flame-retardancy. The carbon powder includes a carbon black, an activated carbon and a black lead. The carbon black is particularly preferably used since it has a small particle size and is available at a low price. The carbon black includes any products obtained by an oil furnace method, a channel method, a gas furnace method, a thermal method, a lamp method, an acetylene method and the like. The amount of the carbon powder to be incorporated is 0.1 to 20 parts by weight, preferably 1 to 10 parts by weight, per 100 parts by weight of the synthetic resin component. When the amount is larger than 20 parts by weight, a molded article threatens to be deteriorated in mechanical strength. When the amount is smaller than 0.1 part by weight, the flame-retardancy tends to be insufficient. The total amount of the magnesium hydroxide, the red phosphorus and the carbon powder in the present invention is 120 parts by weight or less per 100 parts by weight of the synthetic resin. When the total amount is larger than 120 parts by weight, a molded article threatens to be deteriorated in mechanical strength or threatens to have a sense of stiffness as a texture.

The flame-retardant resin composition of the present invention may contain a variety of generally used additives, reinforcing agents and fillers within the range where the purpose of the present invention is not impaired. Examples of these include an antioxidant, a light stabilizer, an ultraviolet absorber, a thermal stabilizer, a metal inactivating agent, a lubricant, a colorant, a blowing agent and a deodorant.

The methods of incorporation, addition and molding are not limited about the flame-retardant rein composition of the present invention. The methods may be any one so long as it can uniformly carry out the mixing, the addition and the molding. For example, each of the above components and other additives are mixed in advance, and then the mixture is directly molded. When it can not be directly molded, the mixture is melt-kneaded with a two-screw extruder, a single-screw extruder, a Banbury mixer, an oven roll or the like, and then the kneaded mixture is inflation-molded, injection-molded, extrusion-molded, blow-molded, press-molded, rotation-molded or calender-molded. Further, the molded article of the flame-retardant resin composition, provided by the present invention, may be used after fabrication such as stretch processing, emboss processing, coating, printing, plating, perforation or cutting. It may be also used with affixed to a material other than the flame-retardant resin composition of the present invention, such as a plasterboard, wood, a block board, a metal material or stone.

The present invention will be explained in detail with reference to Examples hereinafter. In Examples, a BET specific surface area, an average secondary particle diameter, a sodium content in water-soluble sodium salt, a tensile strength at break, elongation at break, flame-retardancy, surface whitening phenomenon and a texture were measured as follows.

(1) Specific surface area according to a BET method:
  Measured with 12 test specimen automatic measuring device, multi sorb 12, supplied by Yuasa Ionics Co., Ltd.
(2) Average secondary particle diameter:
  (magnesium hydroxide, red phosphorus)
  Magnesium hydroxide:
    Measured with a microtrack supplied by Leeds & Nortrup Instruments Company.
  Red phosphorus:
    Measured with a laser diffraction scattering method particle size distribution measuring device, LA-90, supplied by Horiba Seisakusho.
(3) Analysis of sodium of water-soluble sodium salt in magnesium hydroxide:
  10 g of magnesium hydroxide was stirred in 100 ml of ion exchanged-water at 30° C. for 96 hours, and the eluted sodium was measured by an atomic light-absorption method.

(4) Tensile strength at break; Elongation at break:
  Measured according to JIS K 6760. A film having a thickness of 200 μm was measured at a test speed of 200 mm/minute.
(5) Flame retardancy:
  Measured according to JIS D 1201. A test piece having 100 μm was used.
(6) Surface whitening phenomenon
  A test piece having a thickness of 200 μm, a length of 5 cm and a width of 5 cm was completely immersed in 500 ml of ion-exchanged water and kept in the water at 24° C. for 96 hours with introducing carbon dioxide gas into the water. Then, the test piece was taken out of the water. Thereafter, the degree of surface whitening of the test piece was visually evaluated on the basis of the following ratings.
  Class 1: No surface whitening phenomenon
  Class 2: A surface whitening phenomenon is observed only slightly.
  Class 3: A surface whitening phenomenon is observed to some extent.
  Class 4: A surface whitening phenomenon is observed on a large area.
  Class 5: A surface whitening phenomenon is observed all over the surface.
  A test piece coming under class 3 to class 1 means that the test piece has the practical capability of preventing the surface whitening phenomenon, and a test piece coming under class 2 to class 1 is particularly preferred. This test is an accelerated test of the state where a molded article naturally stands in the air or water.
(7) Texture of a film article:
  A film having a thickness of 200 μm was checked for existence or nonexistence of a feel of roughness and a feel of stiffness by visual observation and touch.

EXAMPLE 1

Compositions shown in Example 1 in Table 1 were mixed in advance, and the mixture was extruded at 220° C. with a single-screw extruder, to obtain an intimate mixture. The intimate mixture was dried by a hot air for 6 hours at 105° C. Thereafter, a film having a thickness of 100 μm and a film having a thickness of 200 μm were obtained therefrom by an inflation method at 220° C. These films were measured for a tensile strength at break, elongation at break, flame-retardancy, surface whitening phenomenon and a texture. Table 2 shows the results.

The compositions used for Example 1 were as follows.
Metallocene LLDPE: MFR 1.0 g/10 min, a density of 0.930, a heavy duty package bag grade.
Oxygen-containing resin: EVA resin having MFR 1.0 g/10 minutes, a density of 0.94 and a vinyl acetate content of 15% by weight.
Polymer alloy compatibilizing agent: "Tuftec M-1943", supplied by Asahi Chemical Industry Co., Ltd.
Magnesium hydroxide: non-surface-treated magnesium hydroxide.
Magnesium stearate: Supplied by Seido kagakukogyo.
Red phosphorus: "Novaexcel F-5", supplied by Rinkagaku Kogyo Co., Ltd.
Carbon Black: FEF, by an oil furnace method.
Antioxidant: "Irganox 1010", supplied by Ciba Special Chemicals, CO., Ltd.
Light stabilizer: "Tinuvin 622LD", supplied by Ciba Special Chemicals, CO., Ltd.

EXAMPLES 2 TO 5

A film having a thickness of 100 μm and a film having a thickness of 200 μm were prepared from compositions shown in Examples 2 to 5 in Table 1 in the same manner as in Example 1. These films were subjected to the same tests as in Example 1. Table 2 shows the results.

The magnesium hydroxide used in Example 2 was a magnesium hydroxide which was surface-treated with hot water having 80° C. and containing 3% by weight, based on the magnesium hydroxide, of stearic acid soda, dehydrated fully, then washed with ion exchanged water in an amount of 2 times by weight of the surface-treated product, dried and pulverized.

The magnesium hydroxide used in Example 3 was a magnesium hydroxide obtained as follows. Magnesium hydroxide was acid-resistance-covered in hot water of 80° C. in the presence of 0.3% by weight, as $SiO_2$, based on the magnesium hydroxide, of No.3 liquid glass depolymerized with 1N of hydrochloric acid, and then, further, surface-treated with 2% by weight of stearic acid soda of 80° C. After the surface-treatment, the surface-treated magnesium product was dehydrated fully, washed with ion exchanged water in an amount of 10 times by weight of the surface-treated product, dried and pulverized.

The magnesium hydroxide used in Example 4 was surface-treated with 2.5% by weight of isopropyltriisostearoyltitanate in mixed solvents of triethanol amine and water at 80° C. After the surface-treatment, the same procedures as in Example 2 were carried out.

The magnesium hydroxide used in Example 5 was surface-treated in hot water of 80° C. with 2.5% by weight of stearyl phosphoric acid ester diethanol amine salt, the stearyl phosphoric acid ester diethanol amine salt being a mixture of 50% by weight of diester of the formula (1)

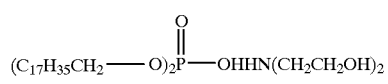

(1)

and 50% by weight of monoester of the formula (2)

(2)

After the surface-treatment, the same procedures as in Example 2 were carried out.

In Examples 2 to 5, the additives other than the magnesium hydroxide were the same additives as those in Example 1 and these additives were added in amounts shown in Table 1.

COMPARATIVE EXAMPLE 1 TO 6

A film having a thickness of 100 μm and a film having a thickness of 200 μm were prepared from compositions shown in Comparative Examples 1 to 6 in Table 3 in the same manner as in Example 1. These films were subjected to the same tests as in Example 1. Table 4 shows the results.

The magnesium hydroxide used in Comparative Example 3 was the same magnesium hydroxide as used in Example 1. The magnesium hydroxide was not surface-treated.

The magnesium hydroxide used in Comparative Example 4 had a large BET specific surface area and a large average secondary particle diameter. The magnesium hydroxide was not surface-treated.

The magnesium hydroxide used in Comparative Example 5 was surface-treated in the same manner as in Example 2. However, the magnesium hydroxide was directly dried by vaporization without dehydration and pulverized. The magnesium hydroxide had approximately the same BET specific surface area and average secondary particle diameter as those in Example 2, while the magnesium hydroxide had a larger sodium content of a water-soluble sodium salt.

The magnesium hydroxide used in Comparative Example 6 was the same magnesium hydroxide as in Example 1.

The red phosphorus used in Comparative Example 6 had a large average secondary particle diameter of 60 μm.

In Comparative Examples 1 to 6, additives other than the above magnesium hydroxides and red phosphorus were the same additives as those in Example 1 and used in amounts shown in Table 3.

TABLE 1 compositions, properties of magnesium hydroxide and red phosphorus

| Composition (parts by weight) | Ex. 1 | Ex. 2 | Ex. 3 | Ex. 4 | Ex. 5 |
|---|---|---|---|---|---|
| Metallocene LLDPE | 85 | 100 | 80 | 90 | 85 |
| oxygen-containing resin (EVA) | 6 | 0 | 5 | 10 | 0 |
| Polymer alloy compatibilizing agent | 9 | 0 | 15 | 0 | 15 |
| Magnesium hydroxide | 63 | 63 | 63 | 63 | 63 |
| Magnesium stearate | 1.5 | 0 | 0.5 | 0 | 0 |
| Red phosphorus | 11 | 11 | 11 | 11 | 11 |
| Carbon black | 4 | 4 | 4 | 4 | 4 |
| Antioxidant | 0.2 | 0.2 | 0.2 | 0.2 | 0.2 |
| Light stabilizer | 0.2 | 0.2 | 0.2 | 0.2 | 0.2 |
| Properties of magnesium hydroxide | | | | | |
| BET specific surface area (m²/g) | 6.3 | 5.9 | 5.8 | 4.5 | 8.7 |
| Average secondary particle diameter (μm) | 0.90 | 0.93 | 0.93 | 1.40 | 0.61 |
| Sodium content of water-soluble sodium salt (ppm) | 30 | 100 | 60 | 30 | 40 |
| Properties of red phosphorus | | | | | |
| Average secondary particle diameter of red phosphorus (μm) | 1.6 | 1.6 | 1.6 | 1.6 | 1.6 |

Note: Ex. = Example

TABLE 2 physical properties of a film article

| | Ex. 1 | Ex. 2 | Ex. 3 | Ex. 4 | Ex. 5 |
|---|---|---|---|---|---|
| Tensile strength at break (kgf/mm²) | 2.30 | 2.04 | 2.38 | 1.95 | 2.18 |
| Elongation at break (%) | 540 | 480 | 550 | 490 | 500 |

TABLE 2-continued physical properties of a film article

| | Ex. 1 | Ex. 2 | Ex. 3 | Ex. 4 | Ex. 5 |
|---|---|---|---|---|---|
| Flame retardancy (JIS D 1201) | Self-extinguishing | Self-extinguishing | Self-extinguishing | Self-extinguishing | Self-extinguishing |
| Surface whitening phenomenon (class) | 2 | 2 | 1 | 2 | 2 |
| Texture of a film article | | | | | |
| Sense of roughness | No | No | No | No | No |
| Sense of stiffness | No | No | No | No | No |

Note: Ex. = Example

TABLE 3 compositions, properties of magnesium hydroxide and red phosphorus

| Composition (parts by weight) | CEx. 1 | CEx. 2 | CEx. 3 | CEx. 4 | CEx. 5 | CEx. 6 |
|---|---|---|---|---|---|---|
| Metallocene LLDPE | 100 | 85 | 85 | 85 | 100 | 85 |
| Oxygen-containing resin (EVA) | 0 | 6 | 6 | 6 | 0 | 6 |
| Polymer alloy compatibilizing agent | 0 | 9 | 9 | 9 | 0 | 9 |
| Magnesium hydroxide | 0 | 0 | 150 | 63 | 63 | 63 |
| Magnesium stearate | 0 | 0 | 1.5 | 1.5 | 0 | 1.5 |
| Red phosphorus | 0 | 0 | 0 | 11 | 11 | 11 |
| Carbon black | 0 | 0 | 0 | 4 | 4 | 4 |
| Antioxidant | 0.2 | 0.2 | 0.2 | 0.2 | 0.2 | 0.2 |
| Light stabilizer | 0.2 | 0.2 | 0.2 | 0.2 | 0.2 | 0.2 |
| Properties of magnesium hydroxide | | | | | | |
| BET specific surface area (m²/g) | — | — | 6.3 | 58 | 5.9 | 6.3 |
| Average secondary particle diameter (μm) | — | — | 0.90 | 6.6 | 0.93 | 0.90 |
| Sodium content of water-soluble sodium salt (ppm) | — | — | 30 | 33 | 2,200 | 30 |
| Properties of red phosphorus | | | | | | |
| Average secondary particle diameter of red phosphorus (μm) | — | — | — | 1.6 | 1.6 | 60 |

Note: CEx. = Comparative Example

TABLE 4 physical properties of a film article

| | CEx. 1 | CEx. 2 | CEx. 3 | CEx. 4 | CEx. 5 | CEx. 6 |
|---|---|---|---|---|---|---|
| Tensile strength at break (kgf/mm$^2$) | 4.00 | 4.20 | 1.30 | 1.28 | 1.97 | 1.30 |
| Elongation at break (%) | 640 | 670 | 200 | 100 | 470 | 150 |
| Flame retardancy (JIS D 1201) | Flammable | Flammable | Flammable | Self-extinguishing | Self-extinguishing | Flammable |
| Surface whitening phenomenon (class) | 1 | 1 | 5 | 5 | 5 | 2 |
| Texture of a film article | | | | | | |
| Sense of roughness | No | No | No | Found | No | Found |
| Sense of stiffness | No | No | Found | No | No | No |

Note: CEx. = comparative Example

As described above, in Examples, there was found no problem in mechanical strength (tensile strength at break and elongation at break), flame retardancy, resistance to surface whitening phenomenon and texture of a film article.

In contrast, in Comparative Examples, problem(s) were found in at least one of the above properties. The differences between Examples and Comparative Examples are apparent.

Effect of the Invention

According to the present invention, there is provided a flame-retardant resin composition by using only a halogen-free flame-retardant to metallocene LLDPE. The flame-retardant resin composition shows a sufficient flame retardancy even in the field of a thin molded article like a film, has a texture (no sense of roughness or stiffness) equivalent to that of a polyvinyl chloride resin, also has no problem in mechanical strength and resistance to surface whitening phenomenon and generates no dioxin at burning. Further, there is provided a molded article obtained from the above resin composition. The flame retardant resin composition and the molded article obtained from the resin composition, provided by the present invention, are suitably used as a substitute of a polyvinyl chloride resin for a parts material for cars, vehicles, ships, aircraft, construction materials, electrical appliances, sundries, etc., for which the polyvinyl chloride resin is conventionally used.

What is claimed is:

1. A flame-retardant resin composition, which comprises 100 parts by weight of a synthetic resin having 70 to 100% by weight of metallocene LLDPE, 20 to 100 parts by weight of a magnesium hydroxide having a BET specific surface area of 20 m$^2$/g or less, an average secondary particle diameter of 5 µm or less, measured according to a laser diffraction scattering method, and a water-soluble sodium salt content of 500 ppm or less as a sodium, 1 to 20 parts by weight of red phosphorus having an average secondary particle diameter of 5 µm or less and 0.1 to 20 parts by weight of a carbon powder, the total of the magnesium hydroxide, the red phosphorus and the carbon powder being 120 parts by weight or less.

2. The composition according to claim 1, wherein 100 parts by weight of the synthetic resin contains a synthetic resin having an oxygen atom in a molecular structure and/or a polymer alloy compatibilizing agent, the total amount of these being 30 parts by weight or less.

3. The composition according to claim 1, wherein the magnesium hydroxide has a BET specific surface area of 1 to 10 m$^2$/g and an average secondary particle diameter of 0.4 to 2 µm measured by a laser diffraction scattering method and has a water-soluble sodium salt content of 200 ppm or less, as a sodium.

4. The composition according to claim 1, wherein the surface of the magnesium hydroxide is acid-resistance-coated with at least one compound selected from the group consisting of a silicon compound, a boron compound and an aluminum compound.

5. The composition according to claim 1, wherein the magnesium hydroxide is surface-treated with at least one compound selected from the group consisting of higher fatty acids, a titanate coupling agent, a silane-coupling agent, an aluminate coupling agent and alcoholic phosphates.

6. The composition according to claim 1, wherein the carbon powder is a carbon black.

7. A molded article formed of the flame-retardant resin composition recited in claim 1.

8. The article according to claim 7, wherein the molded article is a flame-retardant film having a thickness of 300 µm or less.

9. The article according to claim 8, wherein the flame-retardant film shows self extinguishing properties according to JIS D 1201, has a tensile strength at break of at least 1.5 kgf/mm$^2$ and elongation at break of at least 450% and has no sense of roughness and stiffness as a texture.

* * * * *